United States Patent
Bezbaruah et al.

(10) Patent No.: US 8,832,029 B2
(45) Date of Patent: Sep. 9, 2014

(54) INCREMENTAL VIRTUAL MACHINE BACKUP SUPPORTING MIGRATION

(75) Inventors: Angshuman Bezbaruah, Redmond, WA (US); Christopher L. Eck, Sammamish, WA (US); Soumya Kanti Das Bhaumik, Andhra Pradesh (IN); Hasan Serdar Sutay, Seattle, WA (US); Howard Hao, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 13/028,649

(22) Filed: Feb. 16, 2011

(65) Prior Publication Data

US 2012/0209812 A1 Aug. 16, 2012

(51) Int. Cl.
*G06F 17/30* (2006.01)
(52) U.S. Cl.
USPC .......................................................... 707/646
(58) Field of Classification Search
USPC .................................. 707/646; 711/112, 162
See application file for complete search history.

(56) References Cited

U.S. PATENT DOCUMENTS

| | | |
|---|---|---|
| 7,007,044 B1 | 2/2006 | Rafert et al. |
| 7,447,854 B1 | 11/2008 | Cannon |
| 7,707,372 B1 | 4/2010 | Kumar et al. |
| 2007/0266383 A1 | 11/2007 | White |
| 2009/0037680 A1 | 2/2009 | Colbert et al. |
| 2010/0082922 A1 | 4/2010 | George et al. |
| 2010/0228913 A1 | 9/2010 | Czezatke et al. |

OTHER PUBLICATIONS

Siebert, Eric, "What is Changed Block Tracking in vSphere?", Retrieved at << http://itknowledgeexchange.techtarget.com/virtualization-pro/what-is-changed-block-tracking-in-vsphere/ >>, Dec. 2, 2009, pp. 4.
"VMware Storage VMotion", Retrieved at << http://www.vmware.com/files/pdf/VMware-Storage-VMotion-DS-EN.pdf >>, Retrieved Date: Nov. 22, 2010, pp. 2.

*Primary Examiner* — Huawen Peng
(74) *Attorney, Agent, or Firm* — John Jardine; Andrew Sanders; Micky Minhas

(57) ABSTRACT

A record of changes to virtual machine data of a virtual machine and a record of changes to snapshots of the virtual machine that have been received since the virtual machine was last backed up are maintained. In response to it being time to perform an incremental backup of the virtual machine, a portion of the virtual machine data is backed up based on the record of changes to the virtual machine data, and a portion of the snapshots is backed up based on the record of changes to the snapshots. In response to it being time to migrate the virtual machine to a second host device, the virtual machine data, the record of changes to the virtual machine data, the record of changes to the snapshots, and one or more of the snapshots are migrated to the second host device.

20 Claims, 5 Drawing Sheets

INCREMENTAL VIRTUAL MACHINE BACKUP SUPPORTING MIGRATION

BACKGROUND

Virtual machines are software implementations of a physical device that can run programs analogous to a physical device. Virtual machines provide various benefits, but are not without their problems. One such problem is that it can be desirable to backup the data and state of a virtual machine, but such backups can be time consuming and require large amounts of storage space due to the amount of information (the data and state of the virtual machine) being backed up. Additionally, such backups can be difficult to implement due to the ability of many virtual machines to be migrated or moved to different physical host devices, and/or the ability for the underlying physical storage devices used by virtual machines to be changed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, changes to virtual machine data of a virtual machine on a first host device are received, and a record of changes to the virtual machine data that have been received since the virtual machine data was last backed up is maintained. A time to perform an incremental backup of the virtual machine is identified, and in response to it being time to perform the incremental backup a portion of the virtual machine data is backed up based on the record of changes. A time to migrate the virtual machine to a second host device is also identified, and in response to it being time to migrate the virtual machine to the second host device the virtual machine data and the record of changes to the virtual machine data are migrated to the second host device.

In accordance with one or more aspects, changes to snapshots of a virtual machine on a first host device are received and a record of changes to the snapshots that have been received since the virtual machine was last backed up is maintained. A time to perform an incremental backup of the virtual machine is identified, and in response to it being time to perform the incremental backup a portion of the snapshots is backed up based on the record of changes. A time to migrate the virtual machine to a second host device is also identified, and in response to it being time to migrate the virtual machine to the second host device both the record of changes to the snapshots and one or more of the snapshots are migrated to the second host device.

BRIEF DESCRIPTION OF THE DRAWINGS

The same numbers are used throughout the drawings to reference like features.

DETAILED DESCRIPTION

Incremental virtual machine backup supporting migration is discussed herein. A record of changes to data that are made by an application running in a virtual machine (also referred to as virtual machine data) since the virtual machine data was last backed up is maintained. This record is used to determine which virtual machine data is to be backed up when performing an incremental backup. This record remains associated with the virtual machine even if the virtual machine is moved to a new host device and/or the physical storage devices used by the virtual machine are changed.

Similarly, a current state of a virtual machine, referred to as metadata of the virtual machine, can be captured. This current state can include a current state of storage devices used by the virtual machine, a current state of memory devices used by the virtual machine, and a current state of configuration information for the virtual machine. The captured current state of a virtual machine (also referred to as a snapshot) is stored and can be backed up. A record of which snapshots have previously been backed up is maintained, and when performing an incremental backup snapshots that have previously been backed up need not be backed up as part of the incremental backup. This record remains associated with the virtual machine even if the virtual machine is moved to a new host device and/or the physical storage and/or memory components used by the virtual machine are changed.

Figure 1:
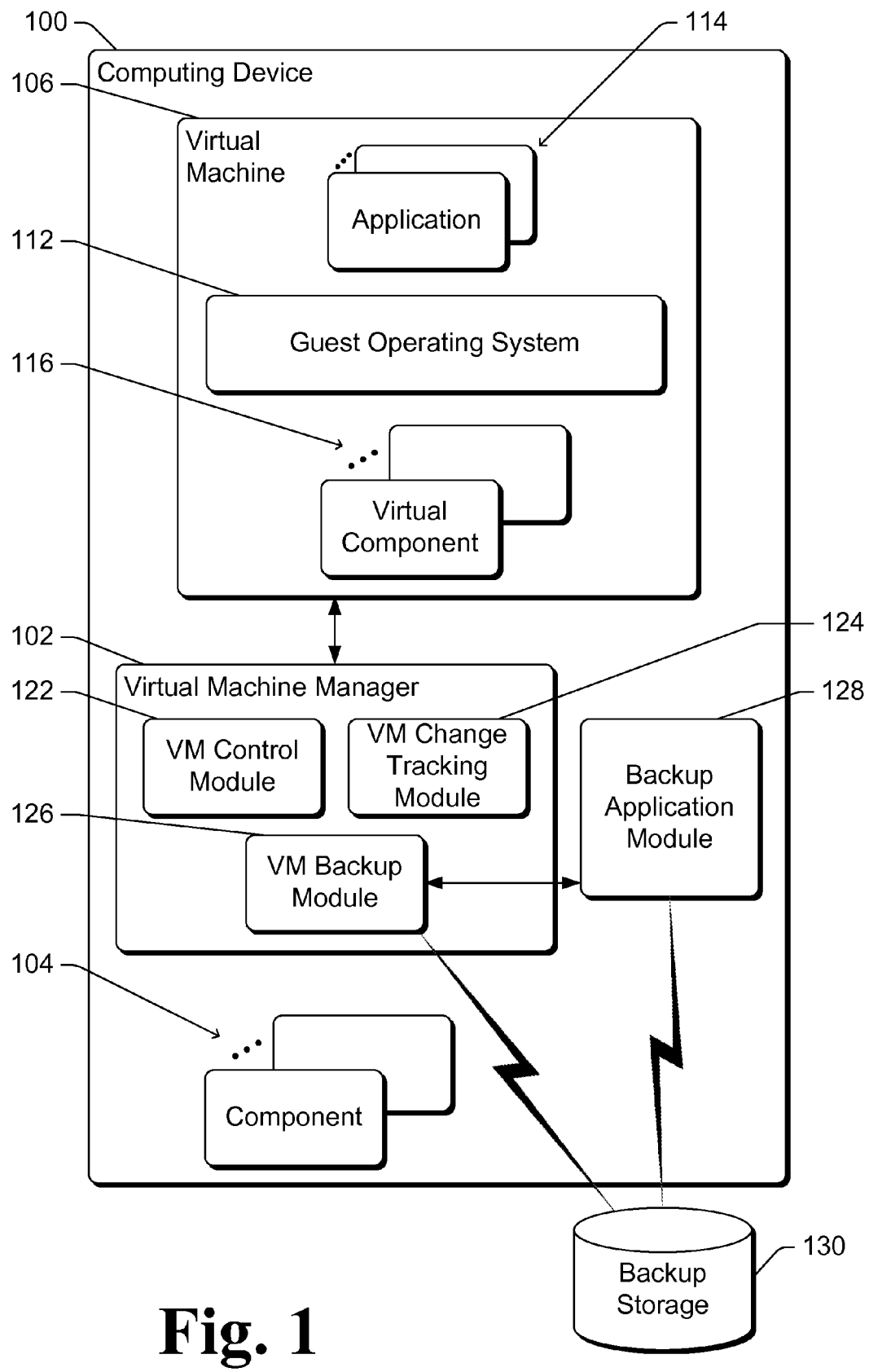
FIG. 1 is a block diagram illustrating an example computing device implementing the incremental virtual machine backup supporting migration in accordance with one or more embodiments.

FIG. 1 is a block diagram illustrating an example computing device 100 implementing the incremental virtual machine backup supporting migration in accordance with one or more embodiments. Computing device 100 can be a variety of different types of devices. For example, computing device 100 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth.

Computing device 100 includes a virtual machine manager 102 and one or more components 104. Virtual machine manager 102 and/or a host operating system (not shown) manages access to the functionality provided by components 104. Components 104 can be a variety of different processor components, input/output (I/O) components, and/or other components or devices. For example, components 104 can include one or more processors or processor cores, one or more memory components (e.g., volatile and/or nonvolatile memory), one or more storage devices (e.g., optical and/or magnetic disks, flash memory drives), communication components (e.g., wired and/or wireless network adapters), combinations thereof, and so forth. Although illustrated as part of computing device 100, one or more components 104 (e.g., one or more storage devices) can be implemented external to computing device 100. Various components or modules running on computing device 100, including virtual machine manager 102, can access this functionality managed by components 104 directly and/or indirectly via other components or modules.

Virtual machine manager 102 allows a virtual machine 106 to run on computing device 100. A single virtual machine 106 is illustrated in computing device 100, although alternatively multiple virtual machines can run on computing device 100. A virtual machine refers to a software implementation of a computing device (or other machine or system) that can run programs analogous to a physical computing device. The virtual machine includes one or more virtual processor components that are similar to (but software implementations of) components 104. An operating system as well as other applications can execute using the virtual components as they would using components 104, including running on virtual processors or virtual processor cores. The operating system and other applications executing in virtual machine 106 need have no knowledge that they are executing in a virtual machine.

Virtual machine 106 includes a guest operating system 112, one or more applications 114, and one or more virtual components 116. Guest operating system 112 runs or executes on one or more virtual processors or processor cores included as one or more of components 116, and manages execution of applications 114.

Virtual machine manager 102 includes a virtual machine (VM) control module 122, a VM change tracking module 124, and a VM backup module 126. Virtual machine control module 122 manages the mapping of virtual components 116 to components 104, including scheduling of virtual processors or processor cores to execute on physical processors or processor cores. Virtual machine change tracking module 124 maintains records of changes to virtual machine data and/or metadata that have occurred since virtual machine 106 was last backed up. Virtual machine backup module 126 manages backing up of virtual machine 106, including backing up virtual machine data as well as virtual machine metadata.

Virtual machine backup module 126 manages backing up of virtual machine 106. Backing up virtual machine 106 refers to copying virtual machine data of virtual machine 106 and/or virtual machine metadata of virtual machine 106 to a backup storage device 130. Virtual machine data refers to data that is read and/or written by an application running in the virtual machine. Metadata of virtual machine 106 refers to the current state of virtual machine 106.

Backup storage device 130 can be coupled to computing device 100 via a network, such as a local area network, the Internet, a cellular or other wireless phone network, a SAN (a storage area network, such as a fiber channel network, a SCSI (small computer system interface) network, etc.), combinations thereof, and so forth. Alternatively, backup storage device 130 can be coupled to computing device 100 in other manners, such as via a universal serial bus (USB) connection, a wireless USB connection, and so forth. Although a single backup storage device 130 is illustrated in FIG. 1, it is to be appreciated that virtual machine backup module 126 can back up virtual machine 106 to multiple storage devices and/or to a backup service including one or more storage devices.

Computing device 100 also includes backup application module 128 that manages various aspects of backing up virtual machine 106. Backup application module 128 can determine times to back up virtual machine 106 in different manners. In one or more embodiments, backup application module 128 is configured with, or has access to, a backup schedule indicating the times (e.g., particular weeks, particular days, particular hours within days, etc.) that virtual machine 106 is to be backed up. Alternatively, backup application module 128 can receive an indication from a user of the times that virtual machine 106 is to be backed up. Alternatively, backup application module 128 can receive an indication from another component or module of computing device 100, or from another device, of the times that virtual machine 106 is to be backed up.

VM backup module 126 supports both incremental backups and full backups. A full backup refers to copying all of the virtual machine data of virtual machine 106 and/or virtual machine metadata of virtual machine 106 to a backup storage device 130. An incremental backup refers to copying portions of the virtual machine data of virtual machine 106 and/or virtual machine metadata of virtual machine 106 to a backup storage device 130 that have been changed since virtual machine 106 was last backed up. An incremental backup can also include copying of some of the virtual machine data of virtual machine 106 and/or virtual machine metadata of virtual machine 106 that has not been changed since virtual machine 106 was last backed up; however, an incremental backup copies less than all of the virtual machine data of virtual machine 106 and/or virtual machine metadata of virtual machine 106. Backup application module 128 can determine whether an incremental backup is to be performed or a full backup is to be performed in a variety of different manners, analogous to the determination of times to back up virtual machine 106 discussed above.

VM backup module 126 backs up virtual machine 106 based on indications or requests received from backup application module 128. Backup application module 128 initiates a backup of virtual machine 106 at the appropriate time, in response to which VM backup module 126 performs the appropriate backup (e.g., full or incremental) of virtual machine 106. To perform the backup, VM backup module 126 provides or identifies to backup application module 128 the appropriate data of virtual machine 106 (based on whether a full or incremental backup). Backup application module 128 in turn copies the data to backup storage 130. Although illustrated as separate modules, alternatively various functionality of backup application module 128 can be incorporated into VM backup module 126, and/or various functionality of VM backup module 126 can be incorporated into backup application module 128.

Virtual machine control module 122 also supports saving snapshots of virtual machine 106. A snapshot of virtual machine 106 is the current state of virtual machine 106, which is also referred to as metadata of virtual machine 106. This current state of virtual machine 106 includes a current state of storage devices used by virtual machine 106, a current state of memory devices used by virtual machine 106, and/or a current state of configuration information for virtual machine 106. The current state of a storage device used by virtual machine 106 refers to any data, instructions, and/or other information stored in a storage device (e.g., magnetic or optical disks, flash memory drives) by any component or module of virtual machine 106, including applications 114, guest operating system 112, and virtual components 116. The current state of a memory device used by virtual machine 106 refers to any data, instructions, and/or other information stored in a memory device (e.g., RAM, flash memory) by any component or module of virtual machine 106, including applications 114, guest operating system 112, and virtual components 116. The configuration information for virtual machine 106 refers to data, instructions, and/or other information used by a component or module of virtual machine 106 and/or virtual machine manager 102 to implement virtual machine 106.

To save a snapshot of virtual machine 106 at a particular point in time, the metadata of virtual machine 106 at that particular point in time is captured or otherwise identified and saved as the snapshot at that particular point in time. The snapshot is typically saved on a storage device of computing device 100 (e.g., a component 104), although can alternatively be saved on another component of computing device 100 or another device.

Figure 2:
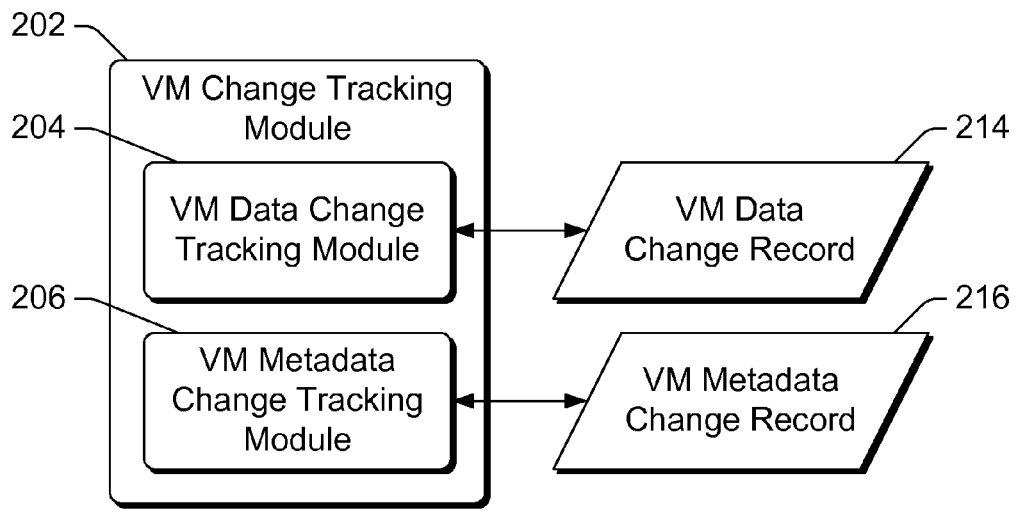
FIG. 2 is a block diagram illustrating an example system implementing the incremental virtual machine backup supporting migration in accordance with one or more embodiments.

FIG. 2 is a block diagram illustrating an example system 200 implementing the incremental virtual machine backup supporting migration in accordance with one or more embodiments. System 200 includes a virtual machine change tracking module 202, which can be virtual machine change tracking module 124 of FIG. 1. Virtual machine change tracking module 202 includes a virtual machine data change tracking module 204 and a virtual machine metadata change tracking module 206.

Virtual machine data change tracking module 204 maintains a record of changes to virtual machine data made by the virtual machine (e.g., virtual machine 106 of FIG. 1). VM data change tracking module 204 identifies, or is notified of, virtual machine data that is written by an application running in the virtual machine. VM data change tracking module 204 maintains a VM data change record 214, which is a record of changes to the virtual machine data since the virtual machine was last backed up. In one or more embodiments, VM data change tracking module 204 determines that each time virtual machine data is written by an application a change to the virtual machine data occurs.

An application can read data from and/or write data to a virtual component that is a storage device (e.g., magnetic or optical disk, flash memory device, etc.), and the virtual component is mapped to a physical storage device by the virtual machine control module. In one or more embodiments, VM data change tracking module 204 is included as part of a virtual machine manager and monitors (e.g., identifies or is notified of) when data is written to the physical storage device by an application in the virtual machine. VM data change tracking module 204 maintains, in VM data change record 214, indications of these changes to the physical storage device. Accordingly, in such embodiments VM data change record 214 identifies changes to one or more physical storage devices to which one or more virtual components are mapped.

In other embodiments, VM data change tracking module 204 monitors (e.g., identifies or is notified of) when data is written to a virtual storage device of a virtual machine. VM data change tracking module 204 maintains, in VM data change record 214, indications of these changes to the virtual storage device. Accordingly, in such embodiments VM data change record 214 identifies changes to one or more virtual storage devices.

VM data change record 214 can be implemented in a variety of different manners. In one or more embodiments, VM data change record 214 is implemented as a differencing disk. When using a differencing disk, changes written by an application after the virtual machine has been backed up are written to a storage device that is referred to as a differencing disk rather than to the storage device to which the application directs the data to be written. The virtual machine manager maintains the differencing disk, and the application and/or virtual machine need have no knowledge of the existence of the differencing disk. The data on the differencing disk, as well as on the storage device to which the application directs the data to be written, can be read back by the application in the virtual machine. Data that has been changed since the virtual machine that was last backed up is read from the differencing disk and is returned to the application, and data that has not been changed since the virtual machine was last backed up is read from the storage device to which the application directs the data to be read and is returned to the application.

The data on the differencing disk can also be combined with data from the storage device to which the application directs the data to be read and/or written, depending on the granularity of the data on the differencing disk. For example, VM data change tracking module 204 can track changes on a block basis. A block can be, for example, 1 megabyte or 2 megabytes (although alternatively other sizes of blocks can be used). If an application writes less than a block of data, then VM data change tracking module 204 (or another module of the virtual machine manager) retrieves the remainder of the block that includes that data from the storage device and stores that remainder of the block, along with the data written by the application, on the differencing disk.

When an incremental backup of the virtual machine is performed, the differencing disk is stored (e.g., to backup storage device 130 of FIG. 1). The data on the differencing disk can also overwrite the data on corresponding portions of the storage device, and the differencing disk can be cleared. Alternatively, an additional differencing disk can be created on which changes written by the application after the incremental backup of the virtual machine are written. Thus, a hierarchy of multiple differencing disks can be generated, with changes to the virtual machine data made since the last incremental backup being stored at each level of the hierarchy.

When a full backup of the virtual machine is performed, the differencing disk(s) and the storage device to which the application directs the data to be read and/or written are combined. For the backup copy of the storage device, data on the differencing disk replaces data that was stored on corresponding portions of the storage device. The data on the differencing disk can also overwrite the data on corresponding portions of the storage device, and the differencing disk(s) can be cleared.

For example, assume an application reads data from blocks 1-100 from a particular storage device, changes some of the data, and then writes back changes to blocks 12 and 57. The virtual machine manager stores the data for blocks 12 and 57 on the differencing disk rather than the particular storage from which the blocks were read. Further assume that the application subsequently reads data from blocks 1-100 from that particular storage device again. The virtual machine manager returns to the application the data from blocks 12 and 57 of the differencing disk, and the data from blocks 1-11, 13-56, and 58-100 from that particular storage device. Similarly, when performing an incremental backup of the virtual machine, the backup copy of that particular storage device includes the data from blocks 12 and 57 of the differencing disk. Blocks 12 and 57 of the differencing disk can replace blocks 12 and 57 on that particular storage device, and blocks 12 and 57 can be deleted from the differencing disk (the differencing disk can be cleared). Alternatively, a new differencing disk can be created, and changes written to that particular storage device after the incremental backup can be written to the new differencing disk.

Alternatively, rather than a differencing disk, VM data change record 214 can be implemented in different manners. In one or more embodiments, VM data change record 214 is implemented as a bitmap, with each location of the bitmap corresponding to a block (e.g., 1 or 2 megabytes) of the storage device. When an application writes data to a block of the storage device, the corresponding location of the bitmap is set (e.g., to a value of "1") to indicate that the block of data has been changed since the virtual machine was last backed up. The locations of the bitmap can then be cleared (e.g., each set to a value of "0") when the virtual machine is again backed up. Thus, at any given time, the bitmap indicates which blocks of the storage device have been changed, and which have not been changed, since the virtual machine was last backed up.

Alternatively, VM data change record 214 can be implemented as a list of block identifiers. Each block identifier identifies a block (e.g., 1 or 2 megabytes) of the storage device. The block identifier can be implemented in various manners (e.g., as numerical identifiers or alphanumeric identifiers) that allow the different blocks on the storage device to be identified. When an application writes data to a block of the storage device, an identifier of the block to which the data is written is added to the list of block identifiers. This list can then be cleared (emptied) when the virtual machine is again backed up. Thus, at any given time, the list of block identifiers indicates which blocks of the storage device have been changed since the virtual machine was last backed up, and any block not on the list has not been changed since the storage device was last backed up.

VM data change record 214 can be used when performing incremental backups of a virtual machine. When performing an incremental backup of a virtual machine, changes to the virtual machine data since the virtual machine was last backed up are saved. VM data change record 214 is a record of changes to the virtual machine data since the virtual machine was last backed up and thus VM data change record 214 readily identifies the virtual machine data that is to be backed up as part of an incremental backup of the virtual machine. VM data change record 214 itself can be copied to backup storage as part of the incremental backup, such as in situations in which VM data change record 214 is a differencing disk. Alternatively, VM data change record 214 can identify which blocks or other portions of a storage device are to be copied to backup storage as part of the incremental backup, such as in situations in which VM data change record 214 is a bitmap or list of block identifiers.

Virtual machine metadata change tracking module 206 maintains a record of changes to metadata of a virtual machine (e.g., of virtual machine 106 of FIG. 1). VM metadata change tracking module 206 identifies, or is notified of, each snapshot of the virtual machine that is captured and saved. VM metadata change tracking module 206 maintains a VM metadata change record 216, which is a record of changes to the saved snapshots that have been made since the virtual machine was last backed up. In one or more embodiments, this record of changes to the saved snapshots is an indication of snapshots that have been captured and saved since the virtual machine was last backed up.

VM metadata change record 216 can be implemented in a variety of different manners. In one or more embodiments, VM metadata change record 216 is implemented as a flag value associated with each snapshot. This flag value can be included as part of the data structure storing the snapshot, or alternatively can be implemented in other manners (e.g., as data associated with the data structure storing the snapshot, as a bitmap with each location of the bitmap corresponding to a snapshot that has been captured and saved, etc.). The flag value associated with a snapshot can be set (e.g., to a value of "1") when the snapshot is captured and saved to indicate that the associated snapshot has not been backed up since being captured and saved. The flag value associated with a snapshot can then be cleared (e.g., set to a value of "0") when the associated snapshot is backed up to indicate that the associated snapshot has been backed up. Thus, at any given time, the flag values associated with the snapshots indicate which snapshots have been backed up and which snapshots have not been backed up.

Alternatively, rather than flag values, VM metadata change record 216 can be implemented in different manners. In one or more embodiments, VM metadata change record 216 is implemented as a list of snapshot identifiers. Each snapshot identifier identifies a particular snapshot that has been captured and saved. The snapshot identifier can be implemented in various manners (e.g., as numerical identifiers or alphanumeric identifiers) that allow the different snapshots that have been captured and saved for a virtual machine to be identified. When a snapshot is captured and saved, an identifier of the snapshot is added to the list of snapshot identifiers. This list can then be cleared (emptied) when the virtual machine is again backed up. Thus, at any given time, the list of snapshot identifiers indicates which snapshots have been backed up and which snapshots have not been backed up.

VM metadata change record 216 can be used when performing incremental backups of a virtual machine. VM metadata change record 216 is a record of changes to the saved snapshots that have been made since the virtual machine was last backed up and thus VM metadata change record 216 readily identifies the snapshots that are to be backed up as part of an incremental backup of the virtual machine. VM metadata change record 216 identifies which snapshots have not been backed up, and the snapshots that have not been backed up are the snapshots that are to be copied to backup storage as part of the incremental backup.

Returning to FIG. 1, virtual machine control module 122 also maintains a record of virtual machines (such as virtual machine 106) running on computing device 100, and supports migration of virtual machines running on computing device 100 to other devices as well as migration of virtual machines running on other devices to computing device 100. A computing device running a particular virtual machine is also referred to as the host or host device of that virtual machine. Virtual machines can be moved or migrated to different host devices, allowing the particular computing device that is running a particular virtual machine to change over time. Virtual machine control module 122 can determine a time to migrate a virtual machine to another host device in a variety of different manners, such as in response to a request from a user of a host device, in response to an indication from another module or component of the host device, in response to an indication from another device or service, and so forth.

Virtual machine control module 122 manages the migration of virtual machines to and/or from computing device 100. This migration includes migration of the current state of the virtual machine to and/or from another host device. Additionally, VM change tracking module 124 associates change tracking information (e.g., VM data change record 214 and VM metadata change record 216 of FIG. 2) with the virtual machine. Thus, the change tracking information maintained by VM change tracking module 124 for a particular virtual machine migrates to the new host along with the current state of the virtual machine, allowing incremental backups to be performed for a virtual machine despite migration of a virtual machine to another host device.

In one or more embodiments, an identifier of a virtual machine that is migrated to a new host device is known to both the new host device and the host device from which the virtual machine is migrated. Both of these host devices associate the change tracking information maintained by the VM change tracking module with the virtual machine, allowing the change tracking information to be migrated along with the virtual machine.

The identifier of the virtual machine can be made known to both the new host device and the host device from which the virtual machine is migrated in a variety of different manners. In one or more embodiments, a configuration management service (e.g., external to the host devices) maintains a record of virtual machine identifiers and which virtual machines are running on which host devices. When a virtual machine is migrated to a new host device, the configuration management service is notified of the new host as well as the identifier of the virtual machine (or alternatively the configuration management service can notify both the new host device and the host device from which the virtual machine is migrated of the identifier of the virtual machine that is to be migrated as well as the new host device for the virtual machine). The configuration management service can provide, to the virtual machine manager on a host device, identifiers of the one or more virtual machines that are running on that host device.

Alternatively, individual backup application modules can communicate with one another identifiers of which virtual machines are hosted by which devices. The backup application modules on the host devices can alternatively receive notifications of migration events, allowing the backup application modules to associate the change tracking information and backups with the appropriate virtual machines. These migration event notifications can be received from the virtualization infrastructure supporting virtual machines on the various host devices, or from other systems or services (e.g., from a data center management solution, such as System Center Virtual Machine Manager (available from Microsoft Corporation of Redmond, Wash.), which keeps track of which virtual machines are located on which computing devices). The backup application modules on the computing devices can register for such migration event notifications, and use them to correlate the virtual machines migrated from one host to another.

Figure 3:
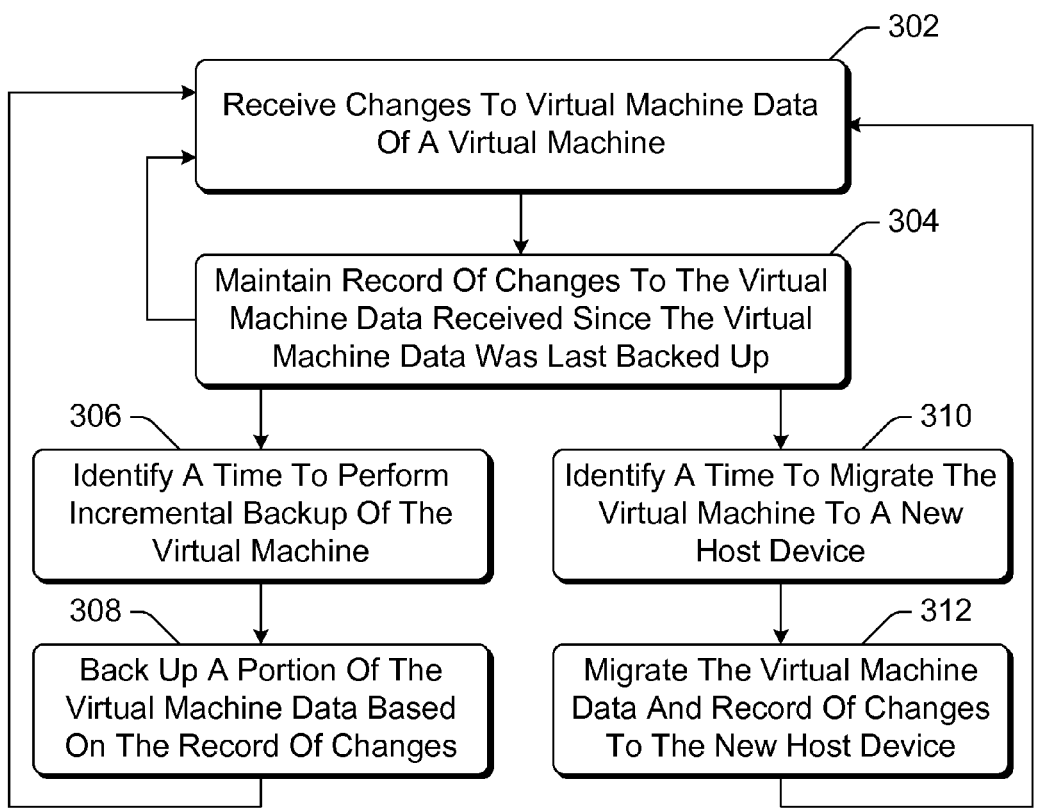
FIG. 3 is a flowchart illustrating an example process for incremental virtual machine backup supporting migration in accordance with one or more embodiments.

FIG. 3 is a flowchart illustrating an example process 300 for incremental virtual machine backup supporting migration in accordance with one or more embodiments. Process 300 is carried out by one or more devices, such as device 100 of FIG. 1, and can be implemented in software, firmware, hardware, or combinations thereof. Process 300 is shown as a set of acts and is not limited to the order shown for performing the operations of the various acts. Process 300 is an example process for incremental virtual machine backup supporting migration; additional discussions of incremental virtual machine backup supporting migration are included herein with reference to different figures.

In process 300, changes to virtual machine data of a virtual machine are received (act 302). These changes are received, for example, by a virtual machine change tracking module, such as module 124 of FIG. 1 or module 202 of FIG. 2.

A record of changes to the virtual machine data received since the virtual machine data was last backed up is maintained (act 304). This record can be maintained in different manners as discussed above, such as using a differencing disk, bitmap, and so forth.

A time to perform an incremental backup of the virtual machine is identified (act 306). This time can be identified in different manners as discussed above.

In response to it being time to perform an incremental backup, a portion of the virtual machine data, based on the maintained record of changes, is backed up (act 308). This portion can be the maintained record of changes (e.g., the differencing disk) or portions of a storage device identified by the record of changes (e.g., identified by a bitmap or list of identifiers) as discussed above.

Additionally, a time to migrate the virtual machine to a new host device is identified (act 310). This time can be identified in different manners as discussed above.

In response to it being time to migrate the virtual machine to a new host device, both the virtual machine data and the record of changes are migrated to the new host device (act 312). Changes to the virtual machine data continue to be received (act 302) and a record of those changes maintained (act 304) at the new host device.

Figure 4:
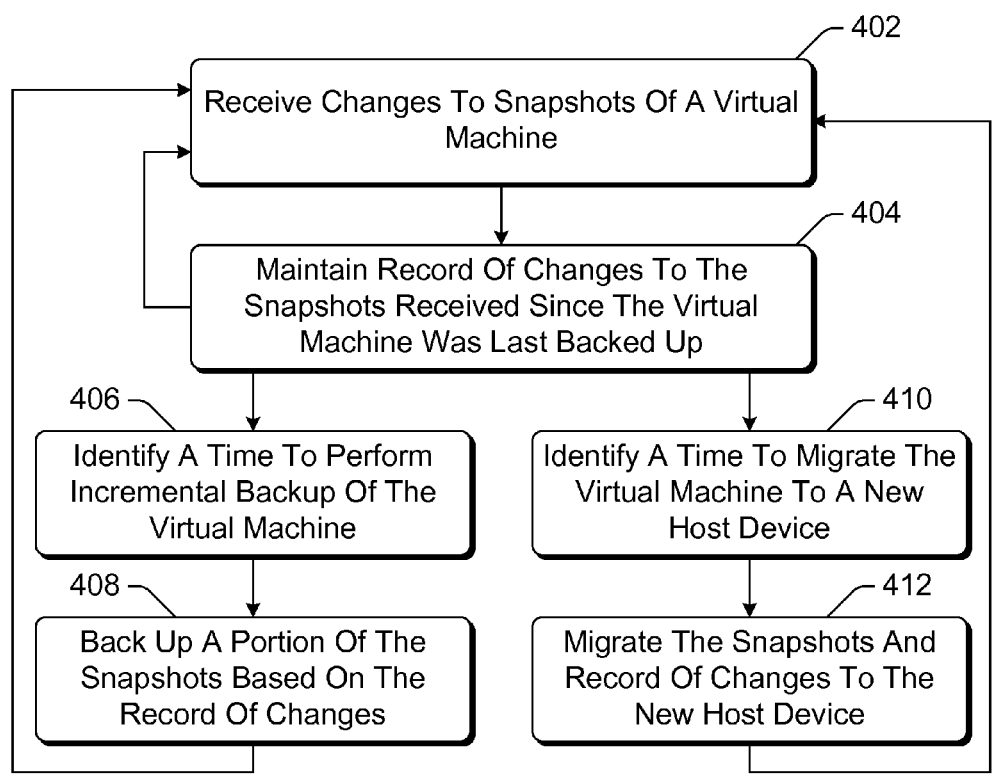
FIG. 4 is a flowchart illustrating another example process for incremental virtual machine backup supporting migration in accordance with one or more embodiments.

FIG. 4 is a flowchart illustrating an example process 400 for incremental virtual machine backup supporting migration in accordance with one or more embodiments. Process 400 is carried out by one or more devices, such as device 100 of FIG. 1, and can be implemented in software, firmware, hardware, or combinations thereof. Process 400 is shown as a set of acts and is not limited to the order shown for performing the operations of the various acts. Process 400 is an example process for incremental virtual machine backup supporting migration; additional discussions of incremental virtual machine backup supporting migration are included herein with reference to different figures.

In process 400, changes to snapshots of a virtual machine are received (act 402). These changes are received, for example, by a virtual machine change tracking module, such as module 124 of FIG. 1 or module 202 of FIG. 2. These changes are, for example, newly captured and saved snapshots of the virtual machine as discussed above.

A record of changes to the snapshots of the virtual machine received since the virtual machine was last backed up is maintained (act 404). This record can be maintained in different manners as discussed above, such as using flag values, lists of identifiers, and so forth.

A time to perform an incremental backup of the virtual machine is identified (act 406). This time can be identified in different manners as discussed above.

In response to it being time to perform an incremental backup, a portion of the snapshots of the virtual machine, based on the maintained record of changes, is backed up (act 408). This portion is, for example, the snapshots (as identified by the record of changes maintained in act 404) that have not yet been backed up as discussed above.

Additionally, a time to migrate the virtual machine to a new host device is identified (act 410). This time can be identified in different manners as discussed above.

In response to it being time to migrate the virtual machine to a new host device, both the snapshots of the virtual machine and the record of changes are migrated to the new host device (act 412). These snapshots that are migrated in act 412 include the snapshots that have not yet been backed up in act 408, as well as the snapshots that have been backed up in act 408. Changes to the snapshots of the virtual machine continue to be received (act 402) and a record of those changes maintained (act 404) at the new host device.

The incremental virtual machine backup supporting migration techniques support various usage scenarios. Virtual machines can be migrated from one host device to another, with backup information being migrated as well. Situations can arise in which the virtual machine itself is migrated to a new host device but one or more physical storage devices are not changed. In such situations, change tracking information (e.g., VM data change record 214 and/or VM metadata change record 216 stored on a local storage device that is not accessible to the new host device) can be migrated to the new host device, or alternatively some change tracking information (e.g., a differencing disk implementing VM data change record 214, a change tracking bitmap stored on a shared device that is accessible to the new host device as well as the host device from which the virtual machine is being migrated, etc.) may not be migrated. Despite being migrated to a new host device, the virtual machine still maps virtual storage devices to the one or more physical storage devices that were not changed.

Situations can also arise in which the virtual machine is not migrated, but one or more physical storage devices are changed. This is also referred to as a type of migration, as information is migrated from one physical storage device to another. In such situations, the mapping of virtual storage devices to physical storage devices is updated as the physical storage devices are changed, and change tracking information (e.g., VM data change record 214 and/or VM metadata change record 216) can be migrated to the one or more new physical storage devices. Whether the change tracking information is migrated to the new physical storage devices can vary based on where the change tracking information is maintained. For example, if the change tracking information is stored on a physical storage device that is being changed (that is, the contents of that physical device are being evacuated to one or more new physical storage devices), then the change tracking information is migrated to the one or more new physical storage devices. However, if the change tracking information is stored on a physical storage device that is not being changed (that is, the contents of that physical storage device are not being evacuated to one or more new physical storage devices), then the change tracking information is not migrated to the one or more new physical storage devices.

Additionally, by implementing the virtual machine change tracking module and virtual machine backup module in the virtual machine manager, the physical storage devices (and any software and/or firmware drivers associated with those physical storage devices) need perform no tracking of changes in order to support incremental backups. The physical storage devices (and any software and/or firmware drivers associated with those physical storage devices) need not even have any knowledge that changes are being tracked and/or incremental backups are supported. During migration of a virtual machine to a new host device, because the change tracking information is migrated along with the virtual machine to the new host device, incremental backups continue to be supported despite such lack of knowledge and/or tracking of changes by the physical storage devices (and any software and/or firmware drivers associated with those physical storage devices).

Figure 5:
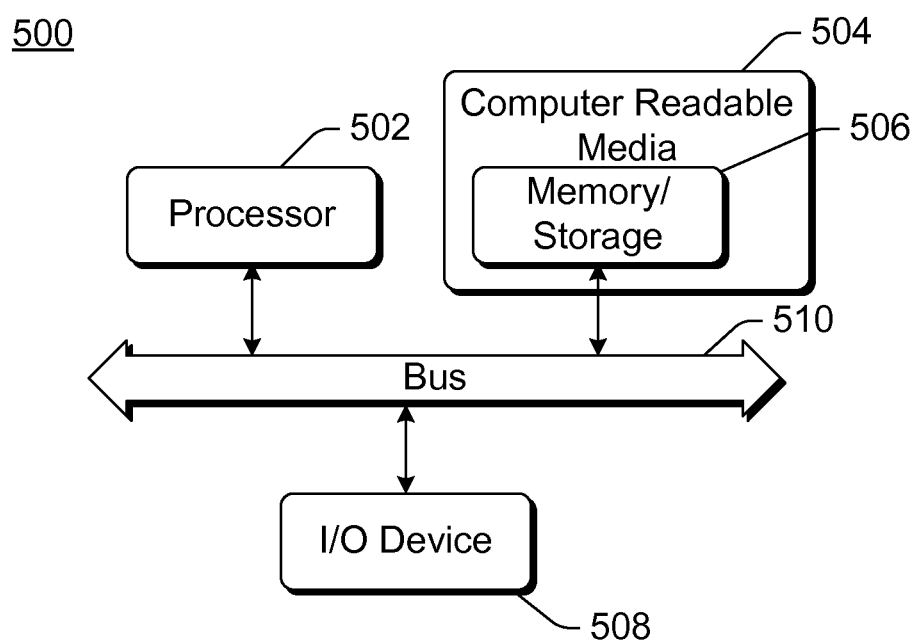
FIG. 5 illustrates an example computing device that can be configured to implement the incremental virtual machine backup supporting migration in accordance with one or more embodiments.

FIG. 5 illustrates an example computing device 500 that can be configured to implement the incremental virtual machine backup supporting migration in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the incremental virtual machine backup supporting migration techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   prior to identifying a time to migrate the virtual machine to a second host device, receiving changes to virtual machine data of a virtual machine on a first host device;
   maintaining a record of changes to the virtual machine data that have been received since the virtual machine data was last backed up including changes to configuration information for the virtual machine comprising data used by a component of the virtual machine to implement the virtual machine;
   identifying a time to perform an incremental backup of the virtual machine;
   backing up, based on the record of changes, a portion of the virtual machine data in response to it being time to perform the incremental backup;
   identifying a time to migrate the virtual machine to a second host device; and
   migrating the virtual machine data and the record of changes to the virtual machine data to the second host device in response to it being time to migrate the virtual machine to the second host device.

2. A method as recited in claim 1, wherein the record of changes comprises a differencing disk that stores virtual machine data written by one or more applications running in the virtual machine since the virtual machine data was last backed up.

3. A method as recited in claim 1, wherein the record of changes comprises a bitmap having multiple locations, each of the multiple locations corresponding to a block of a storage device on which the virtual machine data is stored, each of the multiple locations being set to a particular value if one or more applications running in the virtual machine have written data to a block of the storage device corresponding to the location since the virtual machine data was last backed up.

4. A method as recited in claim 1, wherein the record of changes comprises a list of identifiers of blocks of a storage device on which the virtual machine data is stored, the list of identifiers identifying blocks of the storage device to which one or more applications running in the virtual machine have written virtual machine data since the virtual machine data was last backed up.

5. A method as recited in claim 1, wherein the virtual machine data comprises data read and/or written by one or more applications running in the virtual machine.

6. A method as recited in claim 1, further comprising:
   receiving changes to snapshots of the virtual machine;
   maintaining a record of changes to the snapshots that have been received since the virtual machine was last backed up;
   backing up, based on the record of changes to the snapshots, a portion of the snapshots in response to it being time to perform the incremental backup; and
   migrating both the record of changes to the snapshots and one or more of the snapshots to the second host device in response to it being time to migrate the virtual machine to the second host device.

7. A method as recited in claim 6, wherein the changes to the snapshots comprise new snapshots of the virtual machine that have been captured and saved since the virtual machine was last backed up.

8. A method as recited in claim 1, wherein backing up a portion of the virtual machine data comprises backing up the changes to the virtual machine data that have been received since the virtual machine data was last backed up.

9. A method as recited in claim 1, wherein the virtual machine data was last backed up as part of an incremental backup of the virtual machine.

10. One or more computer storage media having stored thereon multiple instructions that, when executed by one or more processors of a computing device, cause the one or more processors to:
    receive changes to snapshots of a virtual machine on a first host device including changes to configuration information for the virtual machine comprising data used by a component of the virtual machine to implement the virtual machine;
    maintain a record of changes to the snapshots that have been received since the virtual machine was last backed up;
    identify a time to perform an incremental backup of the virtual machine;
    back up, based on the record of changes, a portion of the snapshots in response to it being time to perform the incremental backup;
    identify the time to migrate the virtual machine to the second host device; and
    migrate both the record of changes to the snapshots and one or more of the snapshots to the second host device in response to it being time to migrate the virtual machine to the second host device.

11. One or more computer storage media as recited in claim 10, wherein to maintain the record of changes is to set a flag value associated with each snapshot that has not been backed up to indicate that the snapshot has not been backed up.

12. One or more computer storage media as recited in claim 10, wherein each snapshot of the virtual machine includes a current state of one or more storage devices used by the virtual machine at a time the snapshot is captured and a current state of one or more memory devices used by the virtual machine at the time the snapshot is captured.

13. One or more computer storage media as recited in claim 10, wherein the changes to snapshots of the virtual machine comprise new snapshots of the virtual machine that have been captured and saved since the virtual machine was last backed up.

14. One or more computer storage media as recited in claim 10, wherein the multiple instructions further cause the one or more processors to:
    receive changes to virtual machine data of the virtual machine;
    maintain a record of changes to the virtual machine data that have been received since the virtual machine data was last backed up;

back up, based on the record of changes to the virtual machine data, a portion of the virtual machine data in response to it being time to perform the incremental backup; and migrate both the virtual machine data and the record of changes to the virtual machine data to the second host device in response to it being time to migrate the virtual machine to the second host device.

15. One or more computer storage media as recited in claim 10, wherein to maintain the record of changes is to maintain a bitmap having multiple locations, each of the multiple locations corresponding to a snapshot of the virtual machine, each of the multiple locations being set to a particular value if the snapshot of the virtual machine has not been backed up.

16. One or more computer storage media as recited in claim 10, wherein to maintain the record of changes is to maintain a list of identifiers of snapshots, the list of identifiers identifying snapshots of the virtual machine that have not been backed up.

17. One or more computer storage media as recited in claim 10, wherein to migrate one or more of the snapshots to the second host device is to migrate to the second host device both snapshots that have not been backed up and snapshots that have been backed up, and wherein to migrate the record of changes to the snapshots to the second host device is to migrate to the second host device an indication of which of the snapshots have not been backed up.

18. One or more computer storage media as recited in claim 10, wherein to backup a portion of the snapshots is to back up each of the snapshots that has not previously been backed up.

19. One or more computer storage media as recited in claim 10, wherein the virtual machine was last backed up as an incremental backup of the virtual machine.

20. A method comprising:

receiving changes to virtual machine data of a virtual machine on a first host device, the virtual machine data comprising data read and/or written by one or more applications running in the virtual machine;

maintaining a differencing disk that records changes to the virtual machine data that have been received since the virtual machine data was last backed up;

receiving changes to snapshots of the virtual machine, each snapshot of the virtual machine comprising:
a current state of one or more storage devices used by the virtual machine at a time the snapshot is captured,
a current state of one or more memory devices used by the virtual machine at the time the snapshot is captured, and
a current state of configuration information for the virtual machine at the time the snapshot is captured, the configuration information comprising data used by a component of the virtual machine to implement the virtual machine;

maintaining a record of snapshots that have not been backed up;

identifying a time to perform an incremental backup of the virtual machine;

backing up a portion of the virtual machine data in response to it being time to perform the incremental backup, the backing up comprising saving, to a backup system, the differencing disk and each of the snapshots that has not been backed up;

identifying a time to migrate the virtual machine to a second host device; and migrating, in response to it being time to migrate the virtual machine to the second host device, the virtual machine data, the differencing disk, the record of changes to the snapshots, and one or more of the snapshots to the second host device.

* * * * *